United States Patent [19]

Malville et al.

[11] Patent Number: 5,072,207

[45] Date of Patent: Dec. 10, 1991

[54] DEVICE FOR GENERATING A SIGNAL FOR ONE-BIT MASKING AT THE TIME OF A DYNAMIC COMPARISON OF A MESH OF SERIAL DATA WITH A REFERENCE

[75] Inventors: Joël Malville, Chambly; Patrick Herbault; Bruno Abou, both of Paris, all of France

[73] Assignees: Automobiles Peugeot, Paris; Automobiles Citroen, Neuilly sur Seine, both of France

[21] Appl. No.: 538,411

[22] Filed: Jun. 15, 1990

[30] Foreign Application Priority Data

Jun. 23, 1989 [FR] France ............................ 89 08409

[51] Int. Cl.[5] .................................................. G06F 7/04
[52] U.S. Cl. ..................................................... 340/146.2
[58] Field of Search ....................................... 340/146.2

[56] References Cited

U.S. PATENT DOCUMENTS

| | | | |
|---|---|---|---|
| 3,784,980 | 1/1974 | Geesen | 340/146.2 |
| 4,752,763 | 6/1988 | Hoffman | 340/146.2 |
| 4,812,809 | 3/1989 | O'Leary et al. | 340/146.2 |
| 4,933,662 | 6/1990 | Szczepanek | 340/146.2 |
| 4,958,140 | 9/1990 | Yasuda et al. | 340/146.2 |

FOREIGN PATENT DOCUMENTS 2233164 7/1972 Fed. Rep. of Germany .
58-56027(A) 4/1983 Japan .

OTHER PUBLICATIONS

*IBM Technical Disclosure Bulletin*, vol. 23, No. 5, Oct. 1980, pp. 2032–2033, "Comparison Circuit", H. M. Buettner et al.

*Primary Examiner*—David M. Malzahn
*Attorney, Agent, or Firm*—Burns, Doane, Swecker & Mathis

[57] ABSTRACT

This device includes a control signal generator receiving as input a clock signal whose active front is synchronous with the bits of the mesh, and a reinitialization signal before each comparison, and whose group of outputs is connected to a parallel-series converter receiving as input the reference in parallel form from a programmable reference generator receiving as input an initial reference and a signal of variable level depending on the time, this reference generator being adapted to deliver a programmed reference depending on the desired bit maskings, the output of the parallel-series converter delivering a signal representative of the selected bit of the reference and being connected to the input of means of detection of transition of the output signal of the converter and of generation of a signal for inhibiting the current processing of a bit in response to the detection of a transition in this signal.

3 Claims, 3 Drawing Sheets

DEVICE FOR GENERATING A SIGNAL FOR ONE-BIT MASKING AT THE TIME OF A DYNAMIC COMPARISON OF A MESH OF SERIAL DATA WITH A REFERENCE

The present invention relates to a device for generating a signal for one-bit masking at the time of a dynamic comparison of a mesh of serial data transmitted on a data transmission network, in particular of a motor vehicle, with a reference.

When, in a communication network, in particular of a motor vehicle, various stations effect data transmissions addressed to other stations, each of the latter must analyze the address field belonging to the received mesh in order to determine whether it is or is not the addressee.

It may be necessary, for the internal processing of the data received, to know the state of equality between the received address and the local address although the complete address field has not yet been transmitted.

The address field possibly containing unassigned bits or control bits which are not significantly at the time of the recognition of the address, it turns out to be necessary to be able to mask any bit whatsoever of the received mesh at the time of the analysis of the latter.

Hence the aim of the invention is to propose a device for generating a signal for one-bit masking for a device for bit by bit dynamic comparison of a mesh of data received in serial form, with a reference serialized synchronously with the reception of this mesh.

This makes it possible to obtain in real time the result of the comparison of each bit of the mesh with the reference and the result of the comparison of the n bits already processed.

Moreover, this device enables very simple masking of any bit whatsoever of the received mesh in order to inhibit the comparison of this bit.

To this end, the subject of the invention is a device for generating a signal for one-bit masking at the time of a dynamic comparison of a mesh of serial data transmitted on a data transmission network, in particular for a motor vehicle, with a reference, characterized in that it comprises a control signal generator receiving as input a clock signal whose active front is synchronous with the bits of the mesh, and a reinitialization signal before each comparison, and whose group of outputs is connected to a parallel-series converter receiving as input the reference in parallel form from a programmable reference generator receiving as input an initial reference and a signal of variable level depending on the time, this reference generator being adapted to deliver a programmed reference depending on the desired bit maskings, the output of the parallel-series converter delivering a signal representative of the selected bit of the reference and being connected to the input of means of detection of transition of the output signal of the converter and of generation of a signal for inhibiting the current processing of a bit in response to the detection of a transition in this signal.

Advantageously, the programmable reference generator comprises resistors each of which receives on one terminal the variable signal and whose other terminal is connected to one of the reference lines corresponding to a bit to be processed, and in that the reference lines corresponding to a bit to be masked are not connected to the converter, so as to inhibit the comparison of these bits.

The invention will be better understood with the aid of the description which follows given only by way of example and with reference to the attached drawings in which.

Figure 1:
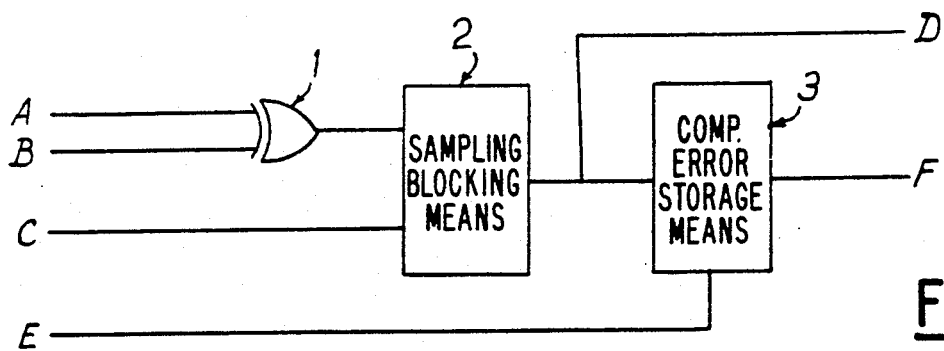
FIG. 1 shows a synoptic diagram illustrating the operating principle of a device for comparing a mesh of serial data with a reference.

As can be seen in FIG. 1 which shows a synoptic diagram of a comparison device, the latter comprises an exclusive-OR gate 1 one input of which receives a signal A consisting of a mesh of serial data transmitted, for example, by a station on a data transmission network, in particular, of a motor vehicle. On another input this exclusive-OR gate 1 receives a signal B consisting of a reference in serial form, the mesh of data A received by the station being for comparison with this reference as explained previously.

To this end, this exclusive-OR gate effects a bit by bit comparison of the mesh of data and the reference, and the output of this exclusive-OR gate is connected to means for sampling-blocking 2 the output signal of this gate.

In fact, these sampling-blocking means 2 receive the result of the comparison present at the output of the exclusive-OR gate 1, sample it at a rate determined by a sampling signal C and store the value obtained until the next sampling signal.

The result of the processing of a bit is ever present at the output of these sampling-blocking means, this signal being referenced D in this figure.

The device also comprises comparison error storage means 3 connected to the output of the sampling-blocking means 2 and receiving a reinitialization signal before each comparison, this signal being referenced by E in this figure.

The output F of these storage means delivers a signal which is representative of the comparison errors for the n bits already processed.

As has previously been mentioned it turns out to be necessary in certain cases to mask any bit whatsoever of a received mesh, at the time of the analysis of the latter.

This operation may be effected in various ways.

Thus for example, this operation may be effected by carrying out an artificial equality of the relevant bit belonging to the mesh to be analysed, with the corresponding bit of the reference.

Figure 2:
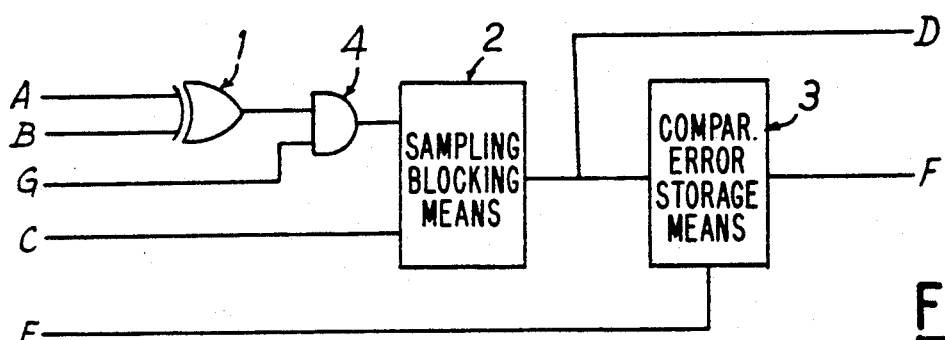
FIG. 2, 3 and 4 show three embodiments of comparison devices comprising means for inhibiting the comparison of a bit.

A device implementing this method is shown in FIG. 2.

The device shown in this figure comprises elements 1, 2 and 3 described in relation with FIG. 1.

Moreover, an AND gate 4 is interposed between the output of the exclusive-OR gate 1 and the input of the sampling-blocking means 2. Hence this gate receives the output signal from the exclusive-OR gate 1 on one input and, on another input, a masking signal G enabling the artificial equality of the bit currently being processed with the corresponding bit of the reference to be effected. This enables inhibition of the comparison of this bit.

Figure 3:
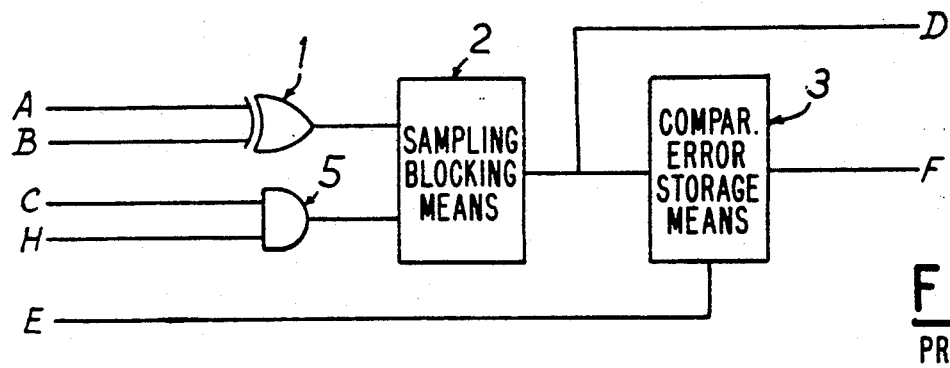

However, the inhibition may also be effected by the suppression of the sampling signal presented to the sampling-blocking means 2, as is shown in FIG. 3. The device shown in this figure still comprises the previously mentioned elements 1, 2 and 3 and an AND gate 5 receiving the sampling signal C on one input and, on another input, a masking control signal H.

The output of this AND gate 5 is connected to the sampling input of the sampling-blocking means 2. The masking control signal H makes it possible to control the suppression of the sampling signal at the output of this gate 5 and hence at the input of the sampling-blocking means, in order to inhibit the comparison of the bit.

Figure 4:
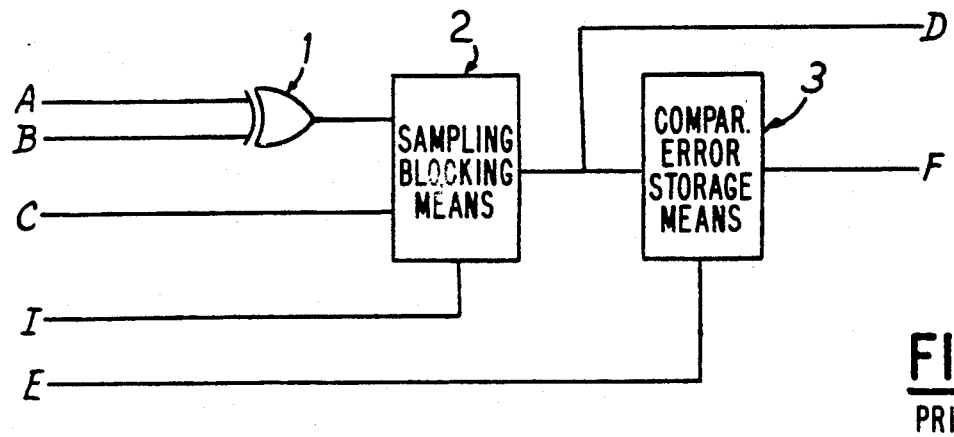

The masking may also be obtained by acting directly on these sampling-blocking means 2, as is shown in FIG. 4.

The device shown in this figure comprises the previously mentioned elements 1, 2 and 3. The sampling-blocking means receive a masking control signal I enabling the output signal from these sampling-blocking means 2 to be forced into a specific state at the time of the comparison of a bit, until the next bit to be processed, in order to inhibit the comparison of the current bit.

Figure 5:
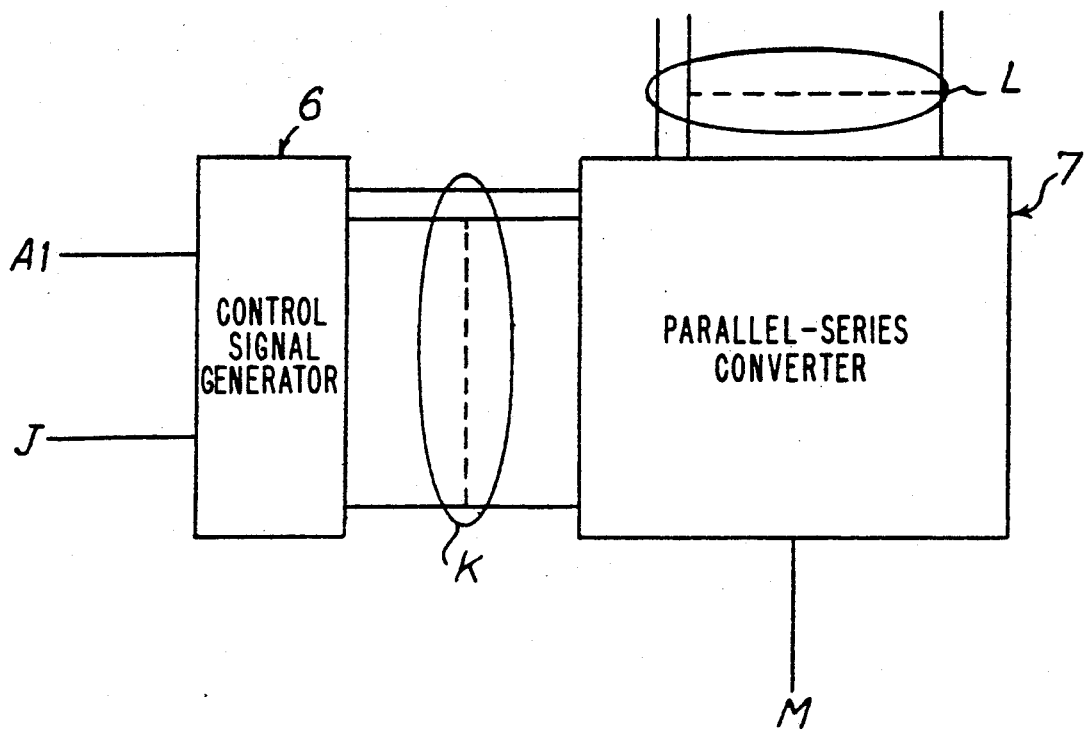
FIG. 5 shows a synoptic diagram of a state of the art device for data serialization.

FIG. 5 shows a state of the art device enabling the transmission of data from a mesh, serially, when it is necessary to know the number of the bit currently being processed.

This device comprises a control signal generator 6 ensuring the processed bit counting function. This generator receives as input a clock signal Al whose active front is synchronous with the start of the bits constituting the mesh to be analysed. This signal constitutes a clock commonly referred to as "clock bit".

This generator also receives as input a signal J for initializing the state of the group of outputs K of this generator. The number of the bit currently being processed is displayed on the group of outputs K.

This generator possesses P outputs with $2^P$ greater than or equal to the number of bits constituting the mesh to be analysed.

These outputs of the control signal generator are connected to inputs of a parallel-series converter 7 receiving as input a reference L in parallel form.

This parallel-series converter 7 presents at its output, that is to say at M, a signal belonging to the group of signals of the reference L, whose rank is designated by the signals K which are present at its input and are generated by the generator 6.

Several methods exist for constructing a signal for inhibiting the processing of a bit. The method most commonly used in the state of the art will be described below in relation with FIG. 6. The signal for inhibiting the processing for an nth bit of the mesh to be processed is obtained by decoding the nth state of the counter pacing the serialization of the reference and the operation of which has been described previously.

Figure 6:
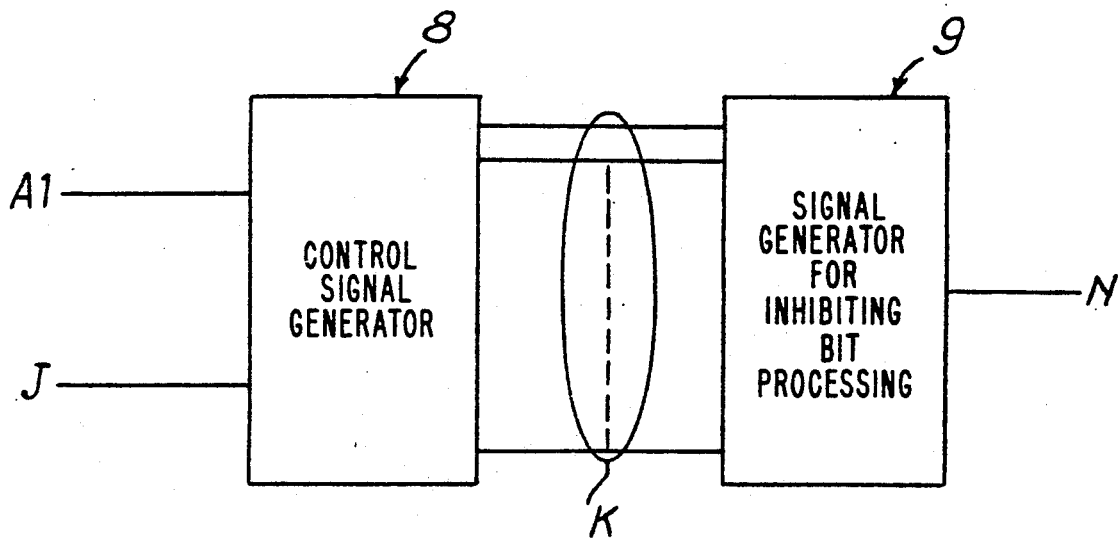
FIG. 6 shows a synoptic diagram of a state of the art device for generating a signal for inhibiting the processing of a bit.

In FIG. 6 a synoptic diagram of a state of the art device for constructing an inhibiting signal is shown. This device comprises a control signal generator 8 analogous to the generator 6 described in relation with FIG. 5 and receiving as input the signals Al and J. The output signals K of this generator are connected to the inputs of a generator 9 of a signal for inhibiting the processing of a bit, this signal being present at the output N of this generator.

Thus the generator 8 ensures the counting of the processed bits. The number of the bit currently being processed is displayed on the group of outputs K and the generator 9 receiving the signals K as input generates at its output a signal N indicating that there is reason to inhibit the processing of the current bit when this signal is active. This is effected when an identity is detected between the binary value associated with the group of signals K and the number of the bit, belonging to the mesh under analysis, which is not to be processed.

However, the number of logic gates used for the construction of the generator 9 grows very rapidly when more than one bit is concerned. Moreover, the complexity of the device increases considerably if it is desired to have the capability for continuously programming the number of the bit or bits which is or are not to be processed.

Figure 7:
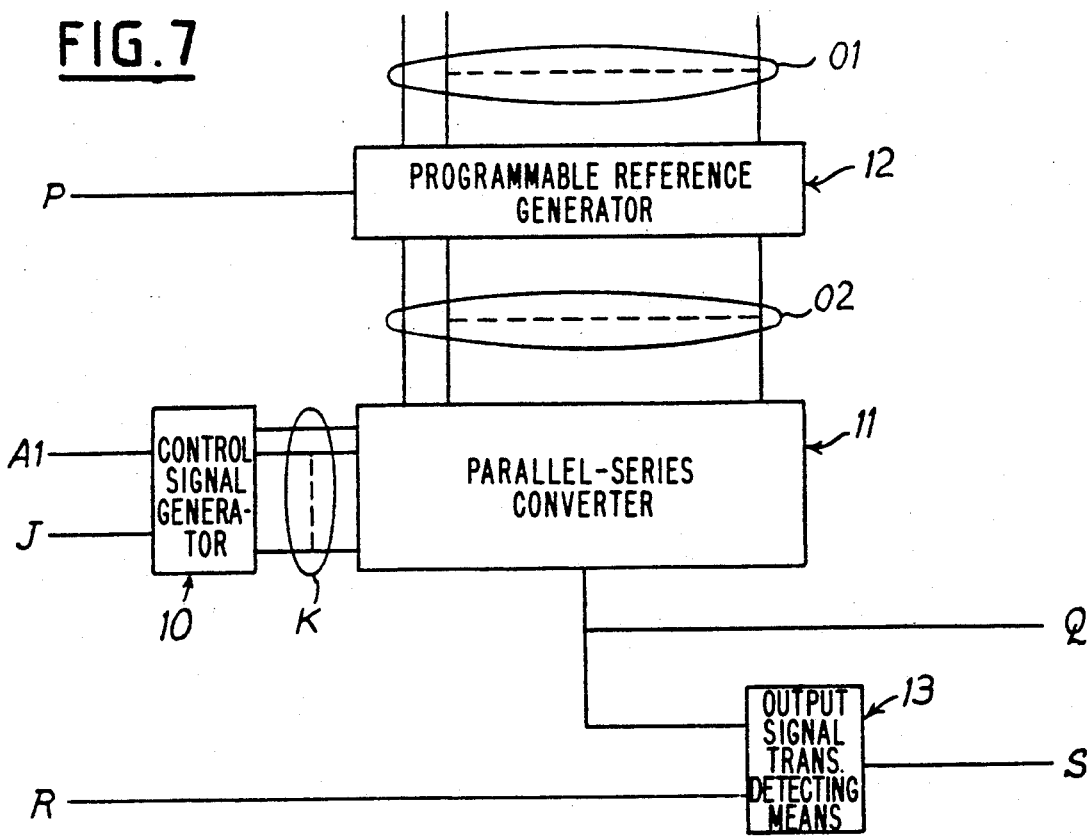
FIG. 7 shows a synoptic diagram of a device for generating a signal for inhibiting the processing of a bit, according to the invention.
Figure 8:
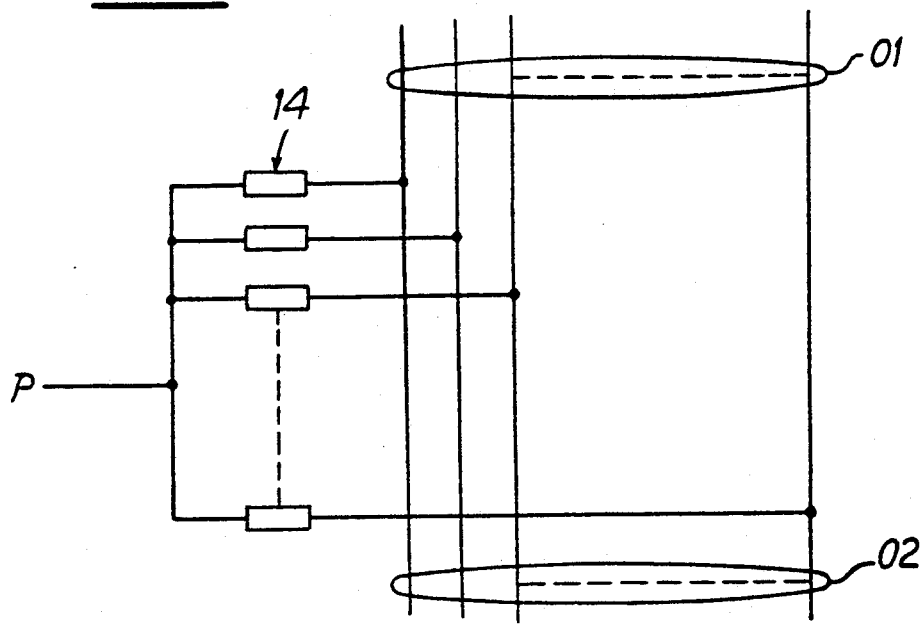
FIG. 8 shows a wiring diagram of a portion of the device shown in FIG. 7.

In order to palliate these disadvantages another solution may be used, like that shown in FIG. 7.

The device according to the invention shown in this figure comprises a generator 10 analogous to the generator 8 described in relation with FIG. 6. This generator 10 receives the signal Al and the signal J as input and presents at its output the group of signals K. This group of signals is connected to the input of a parallel-series converter 11 which will be described in more detail further on.

The device according to the invention shown in this figure also comprises a programmable reference generator 12 receiving as input an initial reference 01 and a signal P of variable level depending on the time, whose frequency is greater than the frequency of the so-called "clock bit" signal Al.

This programmable reference generator 12 is adapted to present a programmed reference 02 at its output, depending on the desired bit maskings, this reference 02 being applied to inputs of the previously mentioned converter 11.

This reference 02 comprises as many signals as there are bits belonging to the mesh to be processed. Each of the signals belonging to this reference has a value equal to that of the signal of identical rank belonging to the reference 01 if the associated bit belonging to the mesh under analysis is to be processed. In the opposite case, this value is equal to the value of the variable signal P. The signal Q at the output of the converter 11, representative of the selected bit of the reference 02, therefore has three possible states for each bit, namely, a 0 logic state, a 1 logic state or variable as a function of time.

The device shown in FIG. 7 also comprises means 13 for detecting a transition of the output signal of the converter 11 and therefore receive this signal on one input and a reinitialization signal R at each new bit, on another input.

These means 13 store any transition of the output signal Q from the converter during the analysis of a bit. If a transition is detected the output signal S from these means 13 is rendered active and used for inhibiting the processing of the relevant bit, as has previously been described.

The number of components for the construction of this device does not depend on the number of unprocessed bits.

If the reference is accessible to a user it suffices, in order to adapt the device to the wishes of the user, to use a device such as that described in relation with FIG.

8, which shows an embodiment of a programmable reference generator 12.

In this figure it is noted that each reference bit line is connected to one terminal of a resistive element, for example 14, the other terminal of which receives the signal P which varies depending on the time.

If it is desired to inhibit the comparison of a bit it suffices not to connect the line of the reference 01 associated with the bit which is not to be processed.

This device makes it possible to overcome poor connection problems which can cause uncertainties of operation resulting from the technology used for the construction of this device and disturbances of the environment.

If the reference is not accessible or is not subject to modifications, for the unprocessed bits it suffices to apply the signal P directly to the relevant inputs of the converter 11 without using resistive elements.

We claim:

1. Device for generating a signal for one-bit masking at the time of a dynamic comparison of a mesh of serial data transmitted on a data transmission network, in particular for a motor vehicle, with a reference, wherein the device comprises a control signal generator receiving as input a clock signal whose active front is synchronous with the bits of the mesh, and a reinitialization signal before each comparison, and whose group of outputs is connected to a parallel-series converter receiving as input the reference in parallel from a programmable reference generator receiving as input an initial reference and a signal of variable level depending on the time, this reference generator being adapted to deliver a programmed reference depending on the sesired bit maskings, the output of the parallel-series converter delivering a signal representative of the selected bit of the reference and being connected to the input of means of detection of transition of the output signal of the converter and of generation of a signal for inhibiting the current processing of a bit in response to the detection of a transition in this signal.

2. Device according to claim 1, wherein the programmable reference generator comprises resistors each of which receives on one terminal the variable signal and whose other terminal is connected to one of the reference lines corresponding to a bit to be processed, and in that the reference lines corresponding to a bit to be masked are not connected to the converter, so as to inhibit the comparison to these bits.

3. Device according to claim 1, wherein the variable signal is applied directly to the inputs of the converter corresponding to bits to be masked so as to inhibit the comparison of these bits.

* * * * *